United States Patent [19]
LaGasse

[11] Patent Number: 5,373,383
[45] Date of Patent: Dec. 13, 1994

[54] OPTICAL CARRIER FILTERING FOR SIGNAL/NOISE AND DYNAMIC RANGE IMPROVEMENT

[75] Inventor: Michael J. LaGasse, Seattle, Wash.

[73] Assignee: The Boeing Company, Seattle, Wash.

[21] Appl. No.: 25,153

[22] Filed: Mar. 2, 1993

[51] Int. Cl.$^5$ .............................................. H04B 10/00
[52] U.S. Cl. ................................... 359/161; 359/181; 359/182; 356/345
[58] Field of Search ............... 359/124, 142, 161, 181, 359/182, 245, 111; 455/47; 375/61; 385/2; 356/345; 250/227.19; 372/32

[56] References Cited

U.S. PATENT DOCUMENTS

| | | | |
|---|---|---|---|
| 3,088,069 | 4/1963 | Markey | 325/49 |
| 3,537,017 | 10/1970 | Judge | 329/122 |
| 4,218,776 | 8/1980 | Seidel | 455/619 |
| 4,253,066 | 2/1981 | Fisher et al. | 329/50 |
| 4,742,576 | 5/1988 | McMahon | 455/617 |
| 4,769,853 | 9/1988 | Goodwin et al. | 455/616 |
| 4,887,900 | 12/1989 | Hall | 356/350 |
| 4,936,645 | 6/1990 | Yoon et al. | 385/2 |
| 5,008,957 | 4/1991 | Kiyono | 359/181 |
| 5,031,235 | 7/1991 | Raskin et al. | 455/612 |
| 5,060,282 | 10/1991 | Molley | 382/42 |
| 5,066,128 | 11/1991 | Lu | 356/349 |
| 5,227,908 | 7/1993 | Henmi | 359/181 |

FOREIGN PATENT DOCUMENTS

| | | | |
|---|---|---|---|
| 2107147 | 4/1983 | United Kingdom | 359/182 |
| 2237469 | 5/1991 | United Kingdom | 359/182 |

Primary Examiner—Jr. Chilcot
Assistant Examiner—Kinfe-Michael Negash
Attorney, Agent, or Firm—Christensen, O'Connor, Johnson & Kindness

[57] ABSTRACT

A method and apparatus for improving the signal-to-noise ratio (SNR) and dynamic range of an optical fiber system. An optical fiber system (10) includes a laser(12) that produces a coherent light signal conveyed over an optical fiber (14) to a Mach-Zehnder modulator (16). An input signal modulates the coherent light, producing modulated side bands, which together with the carrier comprise a modulated light signal. The modulated light signal is filtered using an integrated optical filter (24) that substantially attenuates the carrier frequency, while passing light at the frequency of the modulated side bands. A detector (28) demodulates the filtered light with a substantially greater SNR than would otherwise have been possible. In one preferred form of the invention, the integrated optical filter comprises an imbalanced interferometer (40), and in another embodiment, tile interferometer produces imperfect nulls aligned with the carrier frequency. A relatively higher power laser(12) can be used without damage to detector (28), since the integrated optical filter substantially reduces the average power of the modulated light by attenuating the carrier, thereby enhancing SNR and dynamic range of the system.

22 Claims, 4 Drawing Sheets

OPTICAL CARRIER FILTERING FOR SIGNAL/NOISE AND DYNAMIC RANGE IMPROVEMENT

FIELD OF THE INVENTION

The present invention generally pertains to a fiber optic system for conveying an optical signal that is intensity modulated, and more specifically, to a method and apparatus for producing a modulated optical signal and demodulating the modulated optical signal with a detector.

BACKGROUND OF THE INVENTION

There are numerous applications in which it is preferable to transmit an analog or digital signal over an optical fiber instead of through an electrically conductive cable. An optical fiber offers several inherent advantages over a copper conductor, such as lighter weight and resistance to electromagnetic interference. In recent years, the cost of optical fiber systems has dramatically decreased, while their efficiency has proportionally improved, with losses typically less than 0.1 dB/km. Components, including diode-pumped lasers, modulators, and detectors are readily available from commercial sources to construct a system that can produce coherent light, modulate the light with an analog or digital signal, and convey the modulated signal some distance to a remote detector for demodulation to recover the signal.

However, the transmission of signals over optical fibers is not without its problems. For example, noise on a signal transmission system can significantly impact its ability to convey low amplitude signals developed by radio frequency (RF) remote antenna sources, due to the small optical modulation depth such signals typically develop. Noise affecting a modulated signal in a fiber optic system typically comprises three types, including thermal, shot, and intensity noise, any one or more of which can substantially degrade the system's signal-to-noise ratio (SNR). Aside from noise, several other problems with optical fibers systems have become more evident as low noise diode-pumped solid-state laser sources of increasing power have been developed. Although the higher power provided by such devices can help to improve the SNR signal distortion resulting from harmonic generation in the detector used to demodulate the light signal is a potential source of degraded performance in the system and potentially represents the primary disadvantage of higher power light sources. The problem arises because the higher power light produced by such sources develop high levels of photogenerated charge in the detector, which shield the electric fields comprising the optical signal from the applied bias voltage. If the light signal applied to the detector is sinusoidally modulated, shielding of the electric fields in the detector produces harmonics that distort its output signal.

Thermal damage to detectors can also occur when the power produced by the light source is sufficient to cause over heating. If high frequency photodetectors are required for a particular application, their size must be kept small to limit the effects of capacitance. However, a smaller photodetector is more susceptible to damaging thermal heating caused by receiving an optical signal from a high power laser source.

Higher power laser sources also tend to be more limited by Brillouin scattering, since this characteristic, which is associated with the propagation of an optical signal, increases exponentially with the product of optical power and the length of the optical fiber. Brillouin scattering is due to a coupling between acoustic waves in the optical fiber and the electromagnetic field associated with the optical signal; the scattered light produced by this effect propagates in the opposite direction from that of the optical signal. Since noise initiates the Brillouin scattering process, the SNR is deleteriously affected. Reducing the optical power minimizes the scattering process, but also reduces the SNR.

The conventional method for improving the SNR of an optically modulated signal is to increase the optical power of the signal or to increase the degree of modulation. For certain applications, it is not possible to increase the modulation depth, because the drive signal to the optical modulator is very weak, or because a higher modulation signal would drive the modulator into a non-linear region. The alternative is then to use higher power laser sources; yet, as noted above, increases in optical power are limited by the onset of signal distortion caused by harmonic generation in the detector, Brillouin scattering, or by the maximum photodetector current that might damage the detector. Thus, even though higher optical power sources are more readily available, the power of such sources is not usable in conventional systems. Accordingly, it is evident that there is a need for a new method of handling modulated light signals and for a system that uses higher powered optical sources to convey weak modulation depth signals at acceptable SNR levels not limited by detector distortion, possible detector damage, or Brillouin scattering.

Summary of the Invention

In accordance with the present invention, a method for improving an SNR and a dynamic range with which an input signal is conveyed to a remote site comprises the steps of generating a coherent light signal at a single carrier frequency. The coherent light signal is modulated with the input signal to produce side bands. Frequencies of the side bands are substantially higher and lower than the carrier frequency, and the power of the side bands is substantially less than that of the coherent light signal at the carrier frequency. The coherent light at said carrier frequency and the side bands together comprise a modulated optical signal. The modulated optical signal is selectively filtered as a function of frequency, so that the power of the coherent light signal at the carrier frequency is substantially attenuated, but the power of the side bands is not. At the remote site, the modulated optical signal is demodulated with a detector to recover the input signal.

The step of selectively filtering preferably comprises the step of passing the modulated optical signal through an imbalanced interferometer that has a maximum attenuation near the carrier frequency of the modulated optical signal and a minimal attenuation at frequencies near the frequencies of the side bands. The modulated optical signal is split between two paths. These two paths are then coupled to combine portions of the modulated optical signal traveling along each path. One of the two paths is longer than the other by a differential path length selected to determine the frequency of coherent light attenuated. In one preferred form of the invention, the modulated optical signal is split substantially equally between the two paths and the maximum attenuation frequency is offset from the carrier frequency. In another preferred form of the invention, the modulated optical signal is split unequally between the two paths and the maximum attenuation frequency is substantially equal to the carrier frequency. Either embodiment thus ensures that a portion of the carrier frequency is transmitted through the imbalanced interferometer.

The step of selectively filtering (assuming that a "perfect" null at the carder frequency is achieved by filtering) models the following equation:

$$\frac{P_{out}}{P_{in}} = \cos^2 \frac{\pi}{\lambda} \Delta L$$

where:

$P_{out}$ = the power of the modulated optical signal after being filtered;

$P_{in}$ = the power of the modulated optical signal before being filtered, which is substantially equal to the power of the coherent light signal at the carder frequency (ignoring the power in the side bands, which is small in comparison to the power at the carrier frequency);

$\lambda$ = a wavelength of the coherent light signal at about the carrier frequency (the wavelength of the light attenuated); and $\Delta L$ = the differential path length.

If shot noise is a primary source of noise affecting the SNR with which the input signal is detected, the SNR is proportional or scales as:

$$SNR \sim \frac{(E_L E_m)^2}{E_L^2 + 2E_m^2}$$

where:

$E_L$ = an electric field intensity of the coherent light signal at the carrier frequency; and $E_m$ = an electric field intensity of the side bands.

Alternatively, if relative intensity noise (RIN) is a primary source of noise affecting the SNR with which the input signal is detected, the SNR is proportional or scales as:

$$SNR \sim \frac{(E_L E_m)^2}{(E_L^2 + 2E_m^2)^2}$$

where:

$E_L$ = an electric field intensity of the coherent light signal at the carrier frequency; and $E_m$ = an electric field intensity of the side bands.

For both a shot noise dominated SNR and a detector limited optical power, the optimum ratio of an electric field intensity of the side bands, $E_m$, and an electric field intensity of the coherent light signal at the carrier frequency, $E_L$, should be made equal to about 0.707 to maximize the SNR. In the case of RIN dominated detection, the maximum SNR is achieved with a ratio of 0.07; however, for shot noise dominated SNR the optical power is set to a constant.

Apparatus for improving an SNR and a dynamic range with which an input signal is conveyed to a remote site is another aspect of the present invention. The elements comprising the apparatus perform functions generally consistent with the steps of the method discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
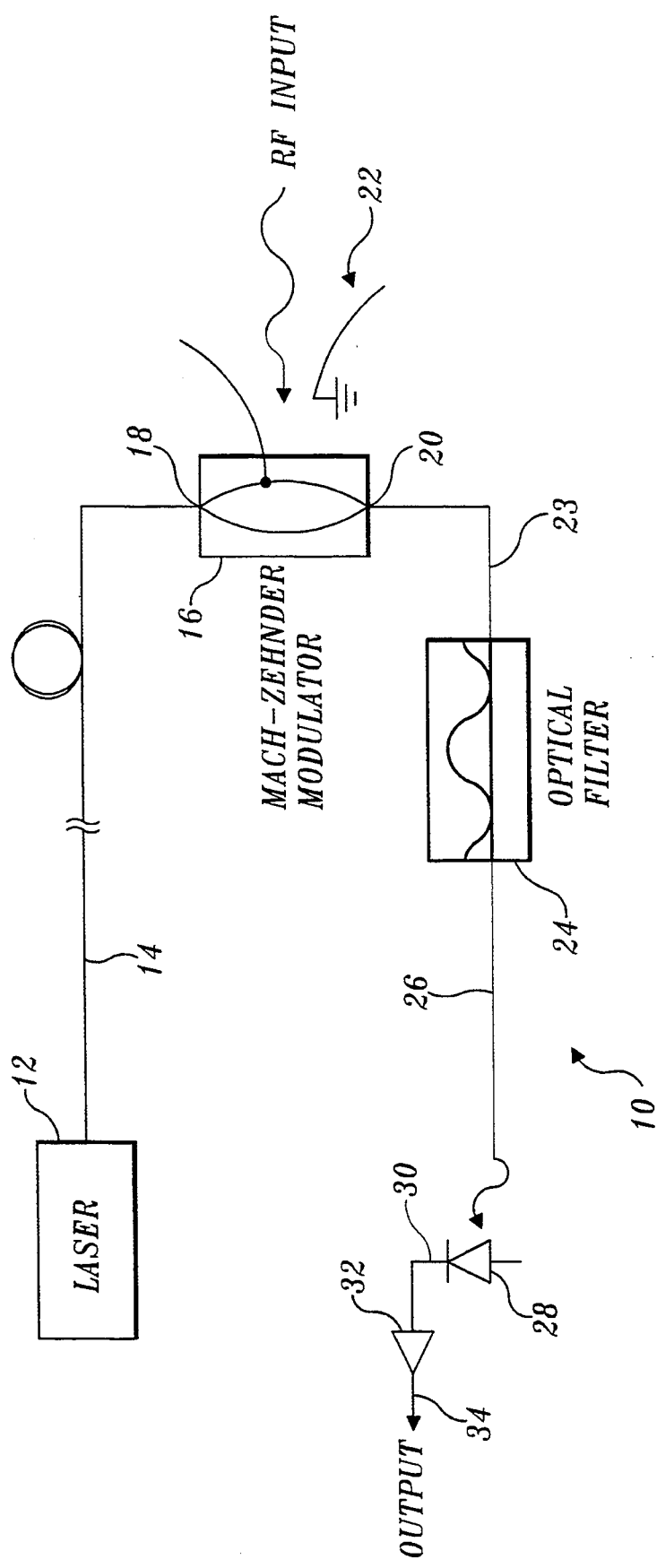
FIG. 1 is a schematic block diagram of an exemplary optical fiber system that incorporates the present invention to convey an RF signal from a remote antenna to a receiver.

Referring first to FIG. 1, an optical fiber system generally identified by reference numeral 10 is represented in a block diagram format. Optical fiber system 10 uses the present invention for acquiring data from a remote antenna 22, i.e., remote from a point at which an RF input signal received by remote antenna 22 is processed to recover the intelligence conveyed by the RF signal. In this exemplary application of the present invention, remote antenna 22 may comprise, for example, an aircraft's radar antenna operating in the 5–9 GHz range or an antenna mounted on an aircraft for receiving information from a control tower or other aircraft (neither shown). The present invention replaces the electrical cable that would normally be installed to convey the RE signal from the antenna with an optical fiber system and, in most such applications, eliminates the need to install signal processing/amplification circuitry at the point where the antenna is mounted to the aircraft. However, it is recognized that there are some applications in which it may be necessary to provide a preamplifier (not shown) to increase the amplitude of the RE signal from the antenna. The RE signal received from the antenna (or preamplifier) is conveyed in the form of a modulated light signal from the remote antenna site to a location at which the signal may more conveniently be recovered and utilized.

In the preferred embodiment illustrated in FIG. 1, optical fiber system 10 includes a laser 12 comprising an intensity-stabilized diode-pumped Nd:YAG laser with an output power of several hundred mW, e.g., 300 mW. Alternatively, a diode-pumped, erbium-doped phosphate glass laser might also be used. The coherent light produced by laser 12 is conveyed through an optical fiber 14 to the site where remote antenna 22 is disposed. Remote antenna 22 receives the RE input signal and applies it to a Mach-Zehnder modulator 16 to modulate the coherent light as it passes through the modulator. Optical fiber 14 is connected to an input port 18 of Mach-Zehnder modulator 16 so that the coherent light conveyed through the optical fiber is split between two paths within the Mach-Zehnder modulator. Both paths are modulated by the RE input signal from remote antenna 22 in a push-pull modulation format, producing upper and lower side bands centered around the carrier frequency of the coherent light output from laser 12, as light traveling along the two paths is combined at the output of the Mach-Zehnder modulator. A modulated light signal that includes the carrier frequency and the upper and lower modulated side bands exits an output port 20 on the Mach-Zehnder modulator. Output port 20 is coupled to a single mode optical fiber 23 that conveys the modulated light signal from Mach-Zehnder modulator 16 to an integrated optical filter 24.

A typical Mach-Zehnder modulator reduces the power of the modulated output signal at its output to approximately one-half. It can be assumed that the RE input signal produces a relatively low optical modulation depth, for example, of about −50 dBc, but the modulation depth can be greater, for example if a preamplifier is used, achieving a modulation depth up to about −14 dBc. We can also assume, as would be typical for an optical fiber system like that shown in FIG. 1, that an optical detector 28 used to detect the modulated light signal output from Mach-Zehnder modulator 16 might have a maximum safe optical power rating of approximately 2 mW or less. (In fact, optical detectors with a maximum optical power rating of about 0.5 mW are not uncommon.)

Clearly, since the average power ($P_{avg}$) of the modulated light output from Mach-Zehnder modulator 16 is approximately 150 mW in the example described above, steps must be taken to reduce the optical power at detector 28 below its maximum rated level to avoid damaging the detector, and also to prevent the detector from generating harmonics that distort its output signal. As shown in FIG. 1, single mode optical fiber 23 connects output port 20 of Mach-Zehnder modulator 16 to integrated optical filter 24. Since the optical power in the modulated side bands of the modulated light signal is negligible compared to the power of the carrier, i.e., the coherent light at the frequency produced by laser 12, integrated optical filter 24 is designed to attenuate the carrier frequency sufficiently to reduce the value of $P_{avg}$ at the detector to substantially less than its rated maximum power. As will be shown below, filtering out most of the light at the frequency of the carrier and passing light at the frequency of the modulated side bands to achieve a 2 mW average power $P_{avg}$ (or less) at the detector not only avoids damaging detector 28 and avoids causing harmonic distortion, it also provides an SNR improvement of approximately 45 dB and increases the dynamic range of optical fiber system 10 by approximately the same factor, compared to simply attenuating the modulated optical signal to a power level of 2 mW without such selective filtering of the signal. A more detailed description of integrated optical filter 24 is presented below.

The output signal from integrated optical filter 24 is conveyed through a single mode optical fiber 26 to detector 28, which preferably comprises a PIN or an avalanche diode. In response to the modulated side bands and the residual carrier output from integrated optical filter 24, detector 28 produces an electrical signal corresponding to the RF input signal applied to remote antenna 22. The signal output from detector 28 is conveyed on a line 30 to a low noise amplifier 32, which amplifies it and conveys it on a line 34 to a receiver (not shown). The combination of a detector and an amplifier is sometimes referred to as a receiver; however, in this description, the term "receiver" simply refers to the component that uses the demodulated signal after it is amplified by low noise amplifier 32.

Figure 2:
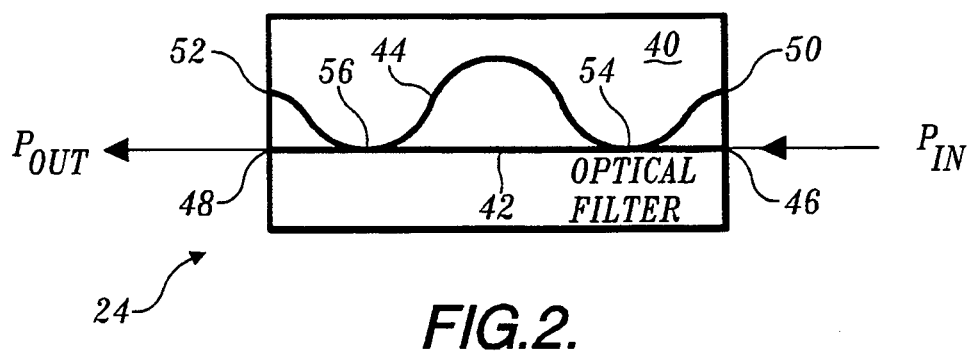
FIG. 2 is a schematic plan view of an imbalanced interferometer used in the optical fiber system of FIG. 1 that filters much of a carrier frequency component of an optical signal, passing modulated side band components.

As illustrated schematically in greater detail in FIG. 2, integrated optical filter 24 preferably comprises an imbalanced interferometer 40. The imbalanced interferometer includes two optical paths 42 and 44, which convey the modulated light signal from an input port 46 of the device to its output port 48. Light path 42 is schematically illustrated as generally following a straight line through the imbalanced interferometer, whereas light path 44 is schematically illustrated as being curved and therefore longer by a predefined increment $\Delta L$. Imbalanced interferometer 40 also includes an input port 50 and an output port 52 that are not used in this application. In a first embodiment of the imbalanced interferometer 40, the modulated light signal entering input port 46 divides equally between the two light paths (e.g., in a ratio of 50/50) at a 3 dB coupler 54, which is formed where light path 44 is incident to light path 42. In this embodiment of the imbalanced interferometer, a slight offset in the minimum frequency from the carrier frequency of the modulated signal is provided.

In a second embodiment of imbalanced interferometer 40 (which looks identical in structure), the modulated optical signal is not split in 50/50 ratio at 3 dB coupler 54. Instead a split of 48/52 is used, to prevent a perfect null at the frequency of maximum attenuation, which is the same as the carrier frequency of the modulated signal. By controlling the splitting ratio, a selected attenuation can be achieved at the maximum attenuation frequency, i.e., at the carder frequency.

The following comments apply to both embodiments of imbalanced interferometer 40. Due to the relatively longer path followed by the portion of the modulated light signal that propagates along light path 44 relative to the portion that propagates along light path 42, a phase shift occurs between the two portions of the light signal. As a result, much of the light signal at the carrier frequency is attenuated by destructive interference as the portion of the modulated light signal traveling along light path 44 mixes with the portion traveling along light path 42 at a 3 dB coupler 56. Coupler 56 is defined where light path 44 again curves into incidence with light path 42. Light paths 42 and 44 are formed on a glass substrate. Such imbalanced interferometers are readily available from a number of commercial sources, such as PIRI ™ (using technology licensed from NTT, a Japanese company) or can be made in the laboratory to achieve the desired attenuation frequency and other desired filter characteristics.

Figure 3:
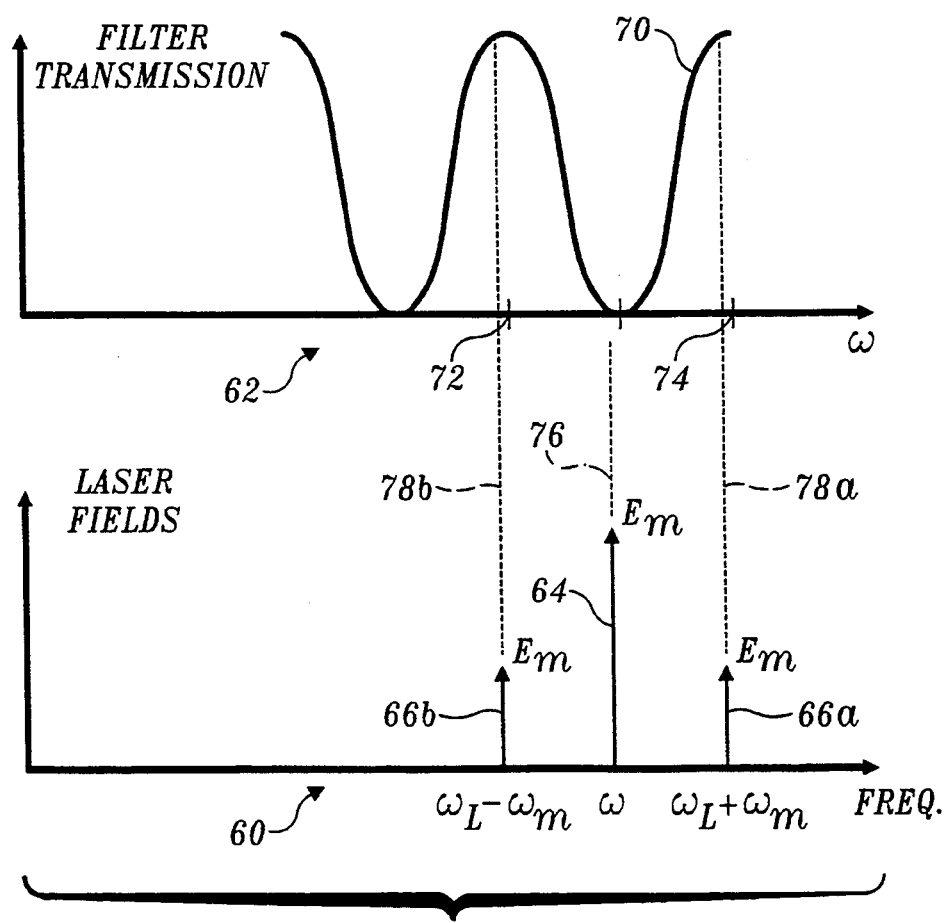
FIG. 3 is a two-pan graph illustrating the transmission characteristics of the imbalanced interferometer of FIG. 2 as a function of frequency of the electrical field of the carrier and side band components of the optical signal, for an embodiment wherein the maximum attenuation frequency of the imbalanced interferometer is displaced from the carrier frequency.
Figure 4:
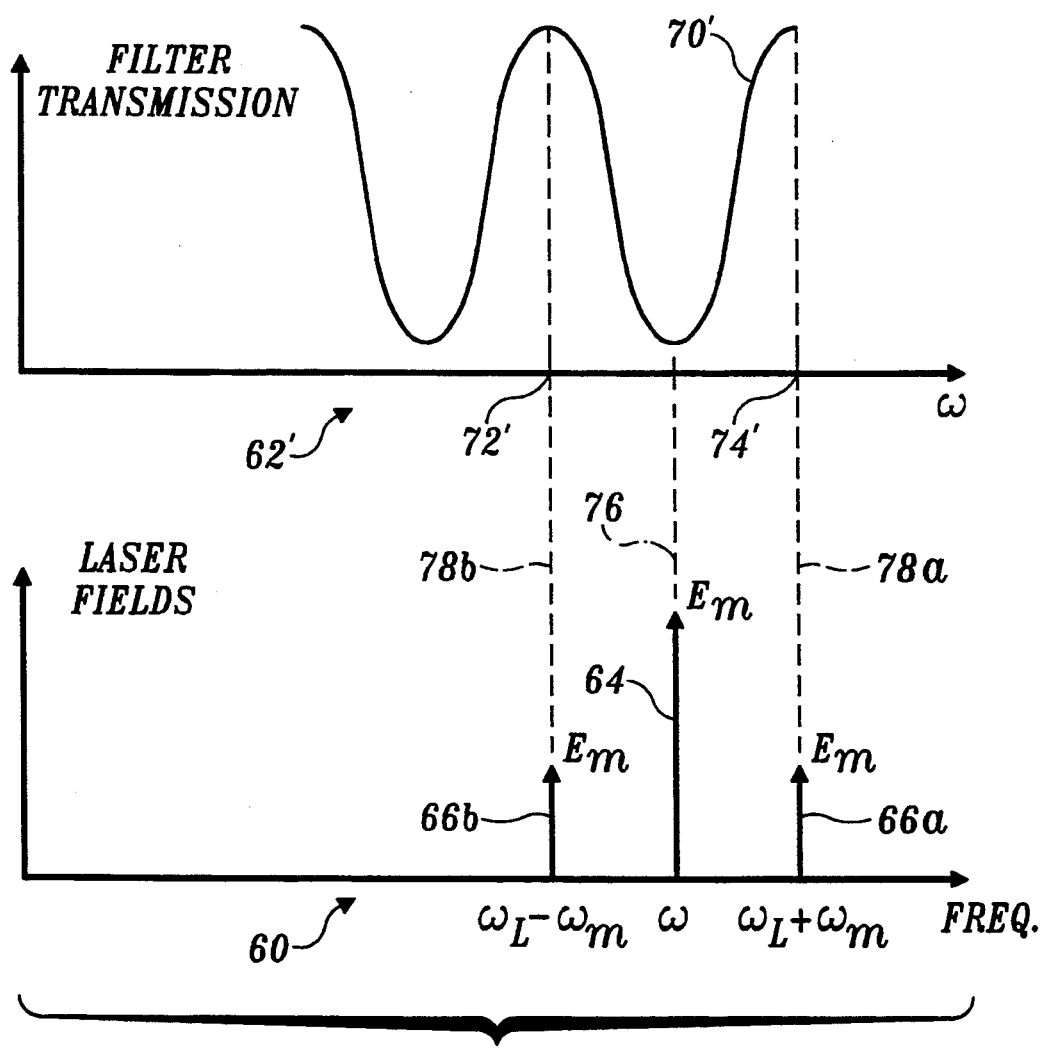
FIG. 4 is a two-pan graph illustrating the transmission characteristics of the imbalanced interferometer of FIG. 2 as a function of frequency of the electrical field of the carrier and side band components of the optical signal for an alternative embodiment wherein the carrier frequency is aligned with the maximum attenuation frequency and the splitting ratio is not 50:50.

The effect of integrated optical filter 24 on the modulated light signal is shown for one embodiment of the imbalanced interferometer in FIG. 3 and for a second embodiment, in FIG. 4. The lower portion of these two Figures is the same, comprising a graph 60 that illustrates an electric field $E_L$ 64 at the frequency of the carrier, i.e., the frequency of laser source 12. Likewise, an upper side band 66a has an electric field, $E_m$, at a frequency equal to the sum of $\omega_L + \omega_m$, as indicated to the right of the carder frequency. Similarly, on the left of the carder, a side band 66b is at a frequency equal to the sum of $\omega_L - \omega_m$. The amplitudes of the carrier electric field 64 and side band electric fields 66a and 66b are not illustrated in true proportion, since the magnitude of the electric field for the carrier 64 is typically about 100 times that of the side bands. The frequency transmission characteristics of integrated optical filter 24 are illustrated in a graph 62 of FIG. 3 by a line 70.

Peak attenuation occurs in the filter at a frequency 74, whereas maximum transmission occurs at frequencies 72. For small frequency changes compared to the optical frequency $\omega$, the transmitted power through imbalanced interferometer 40 is sinusoidal as a function of frequency, generally as shown in graph 62 of FIG. 3 by line 70. The phase function for the imbalanced interferometer is linear in frequency and corresponds to a simple time delay. A value for $\Delta L$ in the imbalanced interferometer is selected so as to attenuate light at the frequency of the unmodulated carrier by a prescribed amount (but not eliminate it completely) and, to pass most of the light at the modulated side band frequencies $\omega_m$. For relatively small signal modulations, the imbalanced interferometer of the first embodiment is thus designed with its minimum transmission (maximum attenuation) frequencies near the carrier frequency and its transmission peaks (minimum attenuation) near the modulated side band frequencies. Such devices are capable of attenuating the carrier frequency by approximately 50 dB.

The frequency of the carrier electric field is extended upwardly from graph 60 in FIG. 3 by a dash line 76, which intersects the frequency axis (abscissa) in graph 62 slightly to the left of (or below) frequency 74. Likewise, the frequencies of the side bands 66a and 66b are respectively extended upwardly from graph 60 by dash lines 78a and 78b, intersecting the frequency axis of graph 62 just to the left of the maximum transmission frequencies 72. The transmission characteristics of integrated optical filter 24 are selected so that a very small percentage of the carrier frequency is transmitted to ensure that the information on the modulated light signal can be recovered by detector 28 by demodulation of the resulting signal.

Referring now to FIG. 4, which shows the filter characteristics of the second embodiment of the integrated optical filter in a graph 62, in will be noted that a dash line 76' intersects the frequency axis (abscissa) in graph 62' at the frequency 74, and the frequencies of the side band 66a and 66b, which are respectively indicated by dash lines 78a' and 78b', intersect the maximum transmission frequencies of the imbalanced interferometer. However, the imbalanced interferometer in this embodiment does not have a perfect null, because the modulated optical signal is not split evenly between the two paths through the integrated optical filter. As a result, a portion of the modulated optical signal at the carrier frequency is transmitted, thereby enabling detector 28 to demodulate the resulting signal.

Because the average power dissipated in detector 28 after filtering of the signal applied to the input of the detector by imbalanced interferometer 40 is less than the rated 2 mW maximum of the detector, damage to detector 28, and generation of harmonic distortion in the detector are avoided by use of the present invention. Furthermore, because the SNR and dynamic range of the detector are substantially enhanced, as will be evident from the following discussion, information conveyed by the RF input signal received by remote antenna 22 is readily recovered by detector 28 and produced as an output signal that is supplied to amplifier 32. The amplifier provides the necessary gain to make the signal more usable, but without the improved SNR resulting from filtering the modulated light signal with the imbalanced interferometer, the signal from the detector would be too noisy to use.

Discussion of Theoretical Operation

Imbalanced interferometer 40 is designed to selectively attenuate the unmodulated light at about the optical frequency of the carrier, while passing light at about the frequency of the modulated side bands to yield the maximum SNR possible. The transmitted normalized power $P_{out}/P_{in}$ at output port 48 of imbalanced interferometer 40 is generally defined by:

$$\frac{P_{out}}{P_{in}} = \cos^2 \frac{\pi}{\lambda} \Delta L \qquad (1)$$

where $P_{out}$ = the power of the modulated optical signal after being filtered; $P_{in}$ = the power of the modulated optical signal before being filtered, which is substantially equal to the power of the coherent light signal at the carrier frequency; $\lambda$ = a wavelength of the coherent light signal at about the carrier frequency (the wavelength of the light attenuated at frequency 74); and $\Delta L$ = the differential path length between light paths 42 and 44.

The 3 dB filter bandwidth of the integrated optical filter is calculated by setting the amplitude of the imbalanced interferometer to the $1\sqrt{2} = 0.07$; points in Equation 1, yielding a bandwidth of approximately 73% of the modulation frequency. For example, if imbalanced interferometer 40 is designed to have a transmission peak at a frequency 72 of approximately 5 GHz, its 3 dB bandwidth would be approximately 3.6 GHz. It should be noted that the present invention uses an imbalanced interferometer with a bandwidth that is less than one octave to avoid generation of second harmonics. This bandwidth can be used for a single broadband link, or multiple channels with narrower bandwidths can be employed. (If necessary, additional channels can be provided using adjacent filter maxima, since the filter is periodic.)

An approximation of the SNR as a function of the electrical fields for the carrier and modulation side bands ($E_L$ and $E_m$) can be derived from a general expression for SNR in terms of average optical power $P_{avg}$ and load resistance $R_L$ as follows:

$$SNR = \frac{(1/2)(mrP_{avg})^2 R_L}{(NF-1)kT/2 + erP_{avg}R_L + RIN(rP_{avg})^2 R_L} \qquad (2)$$

In this equation, m is the optical modulation depth, r is the responsivity of detector 28, NF is the noise figure of amplifier 32, k is Boltzman's constant, T is the temperature in degrees Kelvin, e is the charge on an electron, and RIN is the relative intensity noise of the laser.

For a system that is not limited by thermal noise, the carrier frequency is filtered by integrated optical filter 24 to achieve a maximum SNR as defined by Equation 2. The maximum value of the SNR depends upon specific parameters, such as RIN, noise figure NF, average power $P_{avg}$, and responsivity r. For the case where shot noise dominates the detection of the modulated side bands and where optical power is limited, a maximum value of the SNR can be derived that depends only upon the ratio of the fields $E_L/E_m$. Since for shot noise dominated detection, the thermal (kT/2) and PIN noise terms in Equation 2 can be neglected, and the SNR is approximately scaled in proportion to a ratio of the electric fields of the modulated light signal according to the following equation:

$$SNR \sim \frac{(E_L E_m)^2}{E_L^2 + 2E_m^2} \quad (3)$$

where $(E_L E_m)^2$ and $E_L^2 + 2E_m^2$ are respectively proportional to the signal power and average power.

For intensity modulation with a fixed modulation index, the electric field of the modulated side bands $E_m$ are proportional to the electric field of the carder $E_L$. For this case, Equation 3 clearly shows that the SNR increases in proportion to the optical power and there is no maximum However, when the optical power must be limited to a maximum value, e.g., 2 mW, because of the maximum rated power handling capability of detector 28, a local maxima for the SNR can be derived by setting the average power in Equation 3 (in the denominator) to a constant, substituting for $E_L$ in terms of $E_m$, and differentiating with respect to $E_m$. The results of such a determination show that the maximum SNR occurs for $E_m/E_L = 1/\sqrt{2} = 0.07$. To achieve the benefit of this result, both $P_{avg}$ must be increased and the carrier frequency must be filtered to substantially attenuate it. This principle is applied in the exemplary preferred embodiments to develop a 45 dB improvement in SNR compared to the result obtained without filtering of the carrier frequency by integrated optical filter 24.

Systems that employ laser diodes have high intensity noise compared to diode-pumped solid-state lasers and are frequently limited by RIN. In the case where detection by detector 28 is dominated by RIN, the thermal and shot noise terms are neglected in Equation 2, so that the SNR is proportionally scaled as:

$$SNR \sim \frac{(E_L E_m)^2}{(E_L^2 + 2E_m^2)^2} \quad (4)$$

In Equation 4, the noise power (represented by the denominator of the equation) scales as the square of the optical power. An improvement in SNR obtainable by simply increasing the optical power is limited by the RIN. For fixed modulation levels, the SNR is independent of optical power, since both the numerator and denominator are proportional to the square of the optical power. Furthermore, the RIN dominated noise also differs from the shot noise limited detection in that there is a maxima in the SNR. Power does not need to be increased (as was the case in shot noise dominated detection) to obtain an SNR improvement. Differentiating Equation 4 with respect to $E_m$ and solving for the maximum yields a ratio $E_m/E_L = 1/\sqrt{2} = 0.07$. With reference to the preceding disclosure of the exemplary preferred embodiments, the SNR improvement for RIN-limited detection is approximately 90 dB. However, in reality this improvement is not realized, since SNR limitations due to shot noise or thermal noise tend to occur as the carrier power is decreased. The actual improvement in SNR depends upon the performance of the laser used. For example, with 2 mW maximum power allowed at detector 28, and a laser having a RIN of approximately −140 dB/Hz, reducing the carrier power to about 0.1 mW with imbalanced interferometer 40 improves the SNR by approximately a factor of 20, or by 13 dB. The detection process is then thermal noise limited. Additional improvement can be obtained by using a higher power laser and by additional filtering of the carrier.

Verification of the preceding theory has been borne out by empirical evidence. To test the theory, an imbalanced interferometer was constructed using available optical components, which although not optimized, served to demonstrate the practical value of the present invention. An 850 nm semiconductor laser was intensity modulated at a frequency of 3.2 GHz using a synthesizer with −45 dBm of drive power. A scanning Fabry-Perot interferometer (not shown) was used in the experiment to confirm that the imbalanced interferometer had attenuated the carrier frequency and passed the modulated side bands as desired. An extinction ratio greater than 20 dB for the carrier frequency was noted. Detector 28 for this test comprised an avalanche photodiode, since the optical power was relatively low.

Figure 5A:
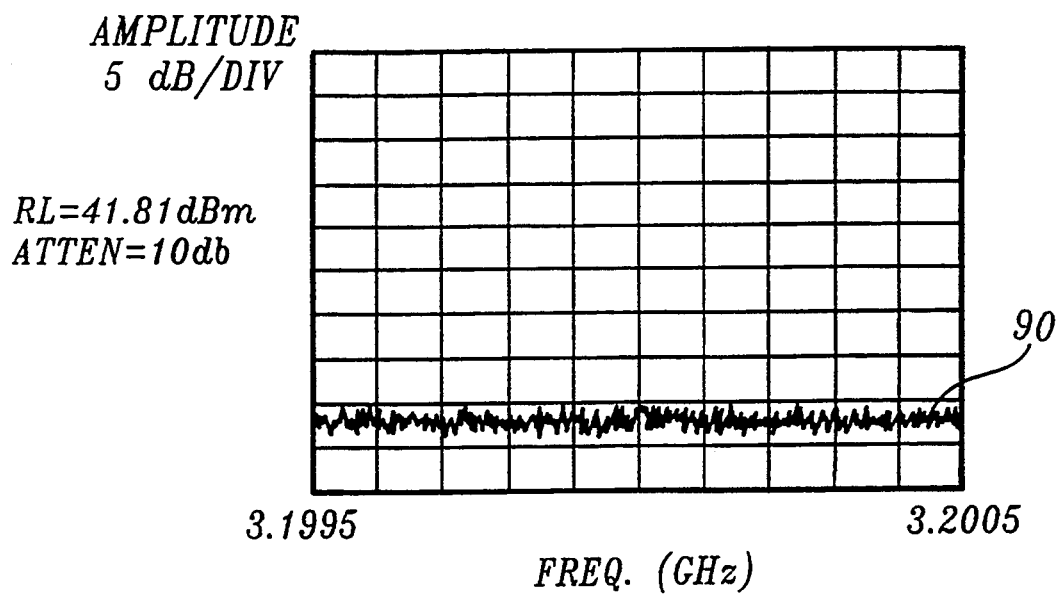
FIGS. 5A and 5B graphically illustrate a measured or observed amplitude of the detected signal as a function of frequency, respectively with and without filtering of the carrier frequency by the imbalanced interferometer of FIG. 2.
Figure 5B:
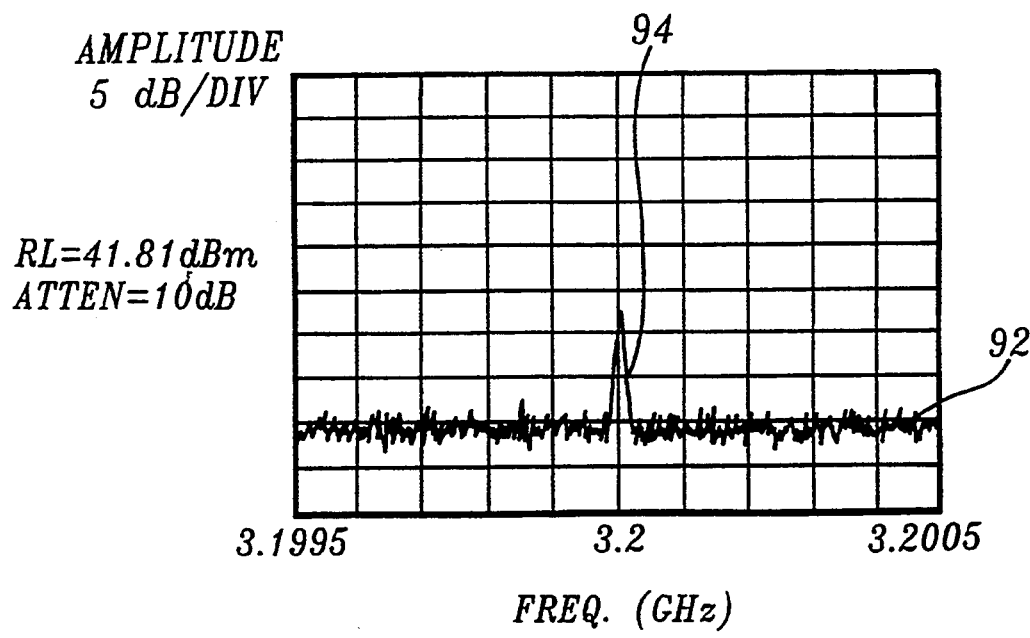

FIG. 5A shows empirical spectrum analyzer data for 50 μA of average detector current resulting when the modulated carrier signal produced by the experimental system was not filtered by the imbalanced interferometer. By comparison, in FIG. 5B, the output signal from the spectrum analyzer shows that with frequency filtering using the imbalanced interferometer, the average optical power is reduced by a factor of 2; however, the SNR is improved by more than 10 dB, even though the average power at the detector is reduced by a factor of 2.

Those of ordinary skill in the art will appreciate that alternative techniques for filtering can be used to provide even more impressive increases in SNR. These and other modifications to the disclosed preferred embodiments that will be apparent to those of ordinary skill in the art are thus included within the scope of the claims that follow. Although the present invention has been disclosed with respect to its preferred embodiments and such modifications thereto, it is not intended that the scope of the invention in any way be limited by the disclosure; instead, the scope of the invention should be determined entirely by reference to the claims.

The embodiments of the invention in which an exclusive property or privilege is claimed are defined as follows:

1. A method for improving a SNR and a dynamic range with which an input signal is conveyed to a remote site, comprising the steps of:
   (a) generating a coherent light signal at a single carrier frequency;
   (b) modulating the coherent light signal with the input signal to produce side bands that are intensity modulated, frequencies of the side bands being substantially higher and lower than the carrier frequency and power levels of the side bands being substantially less than a power level of the coherent light signal at the carrier frequency, the coherent light at said carrier frequency and the side bands together comprising a modulated optical signal;

(c) selectively filtering the modulated optical signal as a function of frequency so that the power level of the coherent light signal at the carrier frequency is substantially attenuated, but the power levels of the side bands are not; and (d) at the remote site, demodulating the modulated optical signal with a detector to recover the input signal.

2. The method of claim 1, wherein the step of selectively filtering comprises the step of passing the modulated optical signal through an imbalanced interferometer that has a maximum attenuation at a frequency that is displaced off-center relative to the carrier frequency of the modulated optical signal, and a minimal attenuation at frequencies near the frequencies of the side bands.

3. The method of claim 1, wherein the step of selectively filtering comprises the step of splitting the modulated optical signal between two paths and then coupling the two paths to combine portions of the modulated optical signal traveling along each path, one of the two paths being longer than the other by a differential path length selected to determine the frequency of coherent light attenuated.

4. The method of claim 3, wherein the modulated optical signal is split unequally between the two paths, and wherein a maximum attenuation frequency provided by the step of filtering is substantially equal to the carrier frequency.

5. The method of claim 3, wherein the step of selectively filtering is defined by an equation as follows:

$$\frac{P_{out}}{P_{in}} = \cos^2 \frac{\pi}{\lambda} \Delta L$$

where:

$P_{out}$ = a power level of the modulated optical signal after being filtered;

$P_{in}$ = a power level of the modulated optical signal before being filtered, which is substantially equal to the power level of the coherent light signal at the carrier frequency;

$\lambda$ = a wavelength of the coherent light signal at the carrier frequency; and $\Delta L$ = the differential path length.

6. The method of claim 1, wherein if shot noise is a primary source of noise affecting the SNR with which the input signal is detected, the SNR approximately scales as:

$$SNR \sim \frac{(E_L E_m)^2}{E_L^2 + 2E_m^2}$$

where:

$E_L$ = an electric field intensity of the coherent light signal at the carrier frequency; and $E_m$ = an electric field intensity of the side bands.

7. The method of claim 1, wherein if relative intensity noise (RIN) is a primary source of noise affecting the SNR with which the input signal is detected, the SNR approximately scales as:

$$SNR \sim \frac{(E_L E_m)^2}{(E_L^2 + 2E_m^2)^2}$$

where:

$E_L$ = an electric field intensity of the coherent light signal at the carrier frequency; and $E_m$ = an electric field intensity of the side bands.

8. The method of claim 1, wherein for both a shot noise dominated SNR and an RIN dominated SNR at the detector, a ratio of an electric field intensity of the side bands, $E_m$, and an electric field intensity of the coherent light signal at the carrier frequency, $E_L$, should be made equal to about 0.07 at the detector to maximize the SNR.

9. Apparatus for improving a SNR and a dynamic range with which an input signal is conveyed to a remote site, comprising:

(a) a source of coherent light at a carrier frequency;

(b) modulator means for modulating the coherent light signal with the input signal to produce side bands that are intensity modulated, frequencies of the side bands being substantially higher and lower than the carrier frequency and power levels of the side bands being substantially less than a power level of the coherent light signal at the carrier frequency, the coherent light at said carrier frequency and the side bands together comprising a modulated optical signal;

(c) filter means for selectively filtering the modulated optical signal as a function of frequency so that the power level of the coherent light signal at the carrier frequency is substantially attenuated, but the power levels of the side bands are not; and (d) detector means, disposed at the remote site, for demodulating the modulated optical signal to recover the input signal.

10. The apparatus of claim 9, wherein the filter means comprise an imbalanced interferometer that provides a maximum attenuation of the modulated optical signal at a frequency that is displaced off-center relative to the carrier frequency of the modulated optical signal and a minimal attenuation at frequencies near the frequencies of the side bands.

11. The apparatus of claim 9, wherein the filter means comprise an imbalanced interferometer that provides a maximum attenuation of the modulated optical signal at a frequency that is substantially equal to the carrier frequency of the modulated optical signal and a minimal attenuation at frequencies near the frequencies of the side bands, and wherein the imbalanced interferometer includes a plurality of light paths and means for splitting the modulated optical signal between the plurality of light paths in unequal proportions to ensure that a selected portion of light at the carrier frequency is transmitted through the filter means.

12. The apparatus of claim 9, wherein the filter means split the modulated optical signal between two paths and then couple the two paths to combine portions of the modulated optical signal traveling along each path, one of the two paths being longer than the other by a differential path length selected to determine the frequency of coherent light attenuated by the filter means.

13. The apparatus of claim 12, wherein the filter means attenuates the modulated optical signal as a function of the wavelength of the coherent light signal at the carrier frequency as defined by:

$$\frac{P_{out}}{P_{in}} = \cos^2 \frac{\pi}{\lambda} \Delta L$$

where:

$P_{out}$ = a power level of the modulated optical signal after being filtered by the filter means;

$P_{in}$ = a power level of the modulated optical signal before being filtered by the filter means, said power level being substantially equal to the power level of the coherent light signal at the carrier frequency;

$\lambda$ = the wavelength of the coherent light signal at the carrier frequency; and $\Delta L$ = the differential path length.

14. The apparatus of claim 9, wherein if shot noise is a primary source of noise affecting the SNR with which the input signal is detected by the detector means, the SNR approximately scales as:

$$SNR \sim \frac{(E_L E_m)^2}{E_L^2 + 2E_m^2}$$

where:

$E_L$ = an electric field intensity of the coherent light signal at the carrier frequency; and $E_m$ = an electric field intensity of the side bands.

15. The apparatus of claim 9, wherein if RIN is a primary source of noise affecting the SNR with which the input signal is detected by the detector means, the SNR approximately scales as:

$$SNR \sim \frac{(E_L E_m)^2}{(E_L^2 + 2E_m^2)^2}$$

where:

$E_L$ = an electric field intensity of the coherent light signal at the carrier frequency; and $E_m$ = an electric field intensity of the side bands.

16. The apparatus of claim 9, wherein for both a shot noise dominated SNR and an RIN dominated SNR at the detector means, a ratio of an electric field intensity of the side bands, $E_m$, and an electric field intensity of the coherent light signal at the carrier frequency, $E_L$, should be made equal to about 0.07 at the detector to maximize the SNR.

17. The apparatus of claim 16, wherein the detector means comprise a solid-state light sensor and an amplifier, said solid-state light sensor producing an output signal corresponding to the input signal that is a function of a product of $E_m$ and $E_L$.

18. The apparatus of claim 9, wherein the filter means comprise two light paths defined on a common substrate, said light paths being coupled adjacent an input port and adjacent an output port so that the modulated optical signal is split between the two light paths and then recombined, one light path being longer than the other.

19. The apparatus of claim 18, wherein the modulated optical signal is split between the two paths to insure that the coherent light at the carrier frequency is not fully attenuated.

20. The apparatus of claim 9, wherein the modulator means comprise a Mach-Zehnder modulator.

21. The apparatus of claim 20, wherein the filter means include means for attenuating the coherent light signal at the carrier frequency in a predefined ratio relative to the side bands to insure that a portion of the coherent light signal at the carrier frequency is present after the filter means, so that the detector means can demodulate the side bands with respect to the coherent light signal at the carrier frequency.

22. The apparatus of claim 9, wherein the source of coherent light has a rated power substantially greater than a maximum rated power of the detector means, said filter means substantially reducing a power level of the modulated optical signal so that it is not greater than the maximum rated power level of the detector means.

* * * * *

UNITED STATES PATENT AND TRADEMARK OFFICE
CERTIFICATE OF CORRECTION

PATENT NO. : 5,373,383
DATED : December 13, 1994
INVENTOR(S) : M.J. LaGasse

It is certified that error appears in the above-indentified patent and that said Letters Patent is hereby corrected as shown below:

| COLUMN | LINE | |
|---|---|---|
| 3 | 10 | "carder" should read --carrier-- |
| 3 | 21 | "carder" should read --carrier-- |
| 4 | 18 | "two-pan" should read --two-part-- |
| 4 | 25 | "two-pan" should read --two-part-- |
| 7 | 6 | "carder" should read --carrier-- |
| 7 | 7 | "carder" should read --carrier-- |
| 8 | 38 | "$1 \sqrt{2} = 0.07;$" should read --$1/\sqrt{2} = 0.707;$-- |
| 9 | 22 | "carder" should read --carrier-- |

UNITED STATES PATENT AND TRADEMARK OFFICE
CERTIFICATE OF CORRECTION

PATENT NO. : 5,373,383

DATED : December 13, 1994

INVENTOR(S) : M.J. LaGasse

It is certified that error appears in the above-indentified patent and that said Letters Patent is hereby corrected as shown below:

| | | |
|---|---|---|
| 9 | 33 | "$E_m/E_L = 1/\sqrt{2} = 0.07$." should read --$E_m/E_L = 1/\sqrt{2} = 0.707$.-- |
| 9 | 64 | "$E_m/E_L = 1/\sqrt{2} = 0.07$." should read --$E_m/E_L = 1/\sqrt{2} = 0.707$.-- |
| 14 (Claim 16, | 3 line 6) | "0.07" should read --0.707-- |

Signed and Sealed this

Fourth Day of April, 1995

Attest:

BRUCE LEHMAN

Attesting Officer

Commissioner of Patents and Trademarks